United States Patent
Brantner et al.

(10) Patent No.: US 9,357,577 B2
(45) Date of Patent: May 31, 2016

(54) AUTOMATED CONNECTION TO A PREFERRED WIRELESS DEVICE

(71) Applicant: Adobe Systems Incorporated, San Jose, CA (US)

(72) Inventors: Brian Jeffrey Brantner, San Francisco, CA (US); Clark Phillip Donahue, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 70 days.

(21) Appl. No.: 14/094,163

(22) Filed: Dec. 2, 2013

(65) Prior Publication Data

US 2015/0156808 A1    Jun. 4, 2015

(51) Int. Cl.
    H04W 4/00      (2009.01)
    H04W 76/02     (2009.01)
    G06F 3/038     (2013.01)

(52) U.S. Cl.
    CPC ........... *H04W 76/025* (2013.01); *G06F 3/0383* (2013.01); *H04W 4/008* (2013.01)

(58) Field of Classification Search
    CPC ..................... H04W 4/008; H04W 76/025
    See application file for complete search history.

(56) References Cited

U.S. PATENT DOCUMENTS

| | | | |
|---|---|---|---|
| 7,509,417 B1* | 3/2009 | Kammer et al. | 709/225 |
| 8,010,105 B2* | 8/2011 | Buckley et al. | 455/435.2 |
| 8,428,038 B1* | 4/2013 | Buttles | 370/338 |
| 2006/0193295 A1* | 8/2006 | White et al. | 370/336 |
| 2013/0095753 A1* | 4/2013 | Chen | 455/41.1 |
| 2014/0018000 A1* | 1/2014 | Seymour et al. | 455/41.2 |

* cited by examiner

*Primary Examiner* — David Bilodeau
(74) *Attorney, Agent, or Firm* — Kilpatrick Townsend & Stockton LLC

(57) ABSTRACT

A method identifies a wireless device in a list of available devices to be a preferred device based on comparing activity levels of devices in the list, the activity levels determined based on prior connections of the available devices to the computing device. The method waits a predetermined time period for a connection from the preferred device and restricts connections to other devices in the list during the period. Another method initially designates a first device in a list of available wireless devices as a preferred wireless device. For each other available device in the list, the method: retrieves properties including an activity level; calculates a recheck timeout based on the properties; and in response to determining that the device's activity level exceeds that of the previously-designated preferred device, designates the device as the preferred device. After the recheck timeout of the preferred device expires, the preferred device is connected.

19 Claims, 7 Drawing Sheets

AUTOMATED CONNECTION TO A PREFERRED WIRELESS DEVICE

TECHNICAL FIELD

This disclosure relates generally to computer-implemented methods and systems for connecting to wireless devices and more particularly relates to systems and methods for automatically connecting to a preferred wireless device.

BACKGROUND

Users working with multiple wireless devices, such as wireless input devices, in a collaborative environment may wish to use such devices with multiple computing devices in order to provide inputs or data to various computing devices, such as a smart phone, a desktop computer, a tablet computer, etc. Working with multiple wireless input devices and computing devices may require quickly switching connections between wireless devices and computing devices to leverage the strengths of particular wireless device-computing device pairings. For example, a user may use a Bluetooth®-enabled stylus input device in an application such as Adobe® Ideas® being executed on a tablet computer to sketch a drawing. The user may then need to use the same stylus in an application on a different computing device, such as an instance of Adobe® Ideas® on another tablet computer.

While the wireless connectivity capabilities of wireless devices and computing devices aids in portability and collaboration with other users, managing connections may prove to be a hindrance for some users and applications, particularly for users in environments where multiple wireless input devices are discoverable by computing devices. Pairing operations are required for certain wireless devices, such as those supporting the Bluetooth® 2.0 or 3.0 specifications. For example, in cases where multiple Bluetooth®-enabled styli are in range of a computing device, a user of the computing device may need to manually select a preferred stylus to connect to. Similarly, the ability to use a wireless input device on multiple computing devices, such as tablet computers, desktop computers, and laptop computers, is sometimes hindered by the need to manually pair and connect the wireless device to the computing devices.

The Bluetooth® 4.0 specification includes a low power mode that simplifies use of low bandwidth wireless devices. Part of this specification known as Bluetooth® Low Energy (BLE) or Bluetooth® Smart eliminates the need to pair devices prior to use. With BLE and Bluetooth® Smart, wireless devices advertise their availability and a host computing device can then connect without user interaction. While such automatic connections eliminate the need for pairing, they can create difficulties where multiple in-range input devices are advertising at the same time. For example, such automatic connections may prove to be a hindrance to keeping a reliable connection between a host and a particular stylus in cases where the host connects with one of many available styli.

SUMMARY

In one embodiment, a method identifies, via a processor at a computing device, a wireless device in a list of available wireless devices to be a preferred wireless device. The identifying is based on comparing activity levels of the available wireless devices in the list, and the activity level of each of the available wireless devices is determined based on one or more prior connections of the respective available wireless device to the computing device. The method further comprise waiting a predetermined time period for a connection from the preferred wireless device such that connection to other wireless devices in the list of available wireless devices is restricted during the predetermined time period. Based on determining that the predetermined time period has expired, the method allows a connection to another wireless device in the list of available wireless devices.

In another embodiment, a method designates a first available wireless device in a list of available wireless devices as a preferred wireless device. Then, for each of the other available wireless devices in the list: properties of a next available wireless device are retrieved from the list; a recheck timeout for the next available wireless device is calculated based on the retrieved properties; and in response to determining that the activity level of the next available wireless device exceeds the activity level of the previously-designated preferred wireless device, the next available wireless device is designated as the preferred wireless device. As a result of completing the determining for the available wireless devices in the list, the method identifies the preferred wireless device.

In yet another embodiment, a computer readable storage medium has executable instructions stored thereon, that if executed by a by a processor of a computing device, cause the processor to perform operations. The instructions comprise instructions for identifying a wireless device in a list of available wireless devices to be a preferred wireless device, the identifying based on comparing activity levels of the available wireless devices in the list, the activity level of each of the available wireless devices determined based on one or more prior connections of the respective available wireless device to the computing device. The computer readable storage medium also has instructions for waiting a predetermined time period for a connection to be established with the preferred wireless device, wherein connection to other wireless devices in the list of available wireless devices is restricted during the predetermined time period. The computer readable storage medium has further instructions for, based on determining that the predetermined time period has expired, allowing a connection to another wireless device in the list of available wireless devices.

According to another embodiment, a system includes a one or more computing devices, each including a processor and a memory having instructions stored thereon, that, if executed by the processor, cause the processor to perform operations. The operations include receiving, from one or more wireless devices, properties of the one or more wireless devices, the properties including, for each of the one or more wireless devices, a unique identifier and an activity level. The operations also include populating a list of available wireless devices with the received properties and designating a first available wireless device in the list as a preferred wireless device. The operations include, for each of the other available wireless devices in the list: retrieving properties of a next available wireless device from the list; calculating, based on the retrieved properties, a recheck timeout for the next available wireless device; and in response to determining that the activity level of the next available wireless device exceeds the activity level of the previously-designated preferred wireless device, designating the next available wireless device as the preferred wireless device. Repeating the retrieving, calculating, and determining for each of the other available wireless devices in the list results in the preferred wireless device being identified.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
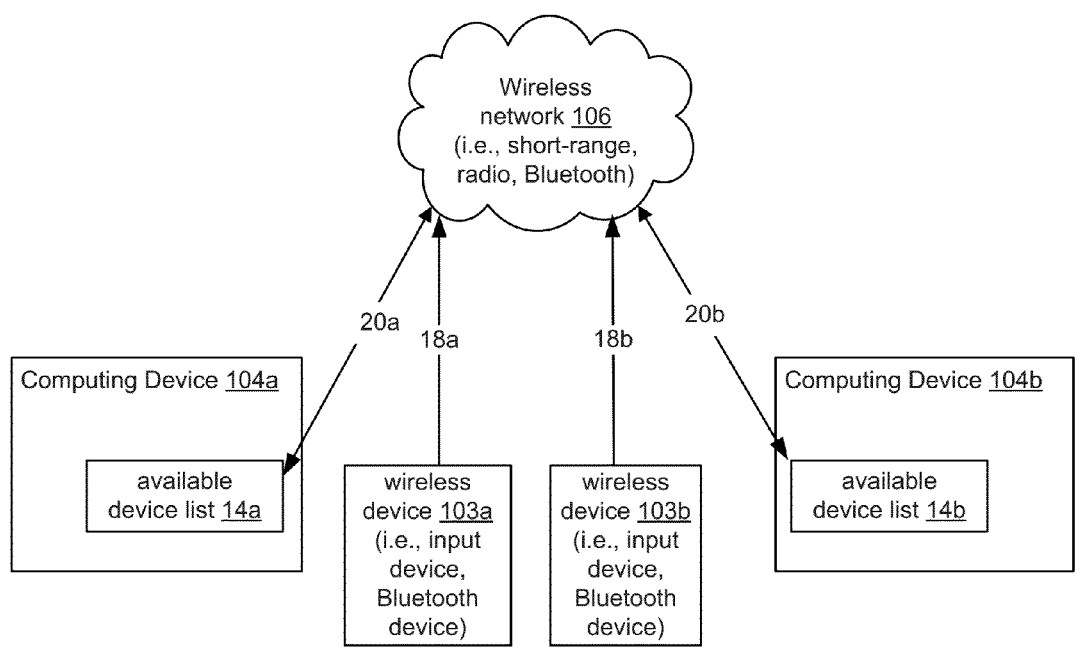
FIG. 1 is a block diagram illustrating communication flows between wireless devices and computing devices for connecting a wireless device to a computing device as a preferred device, in accordance with embodiments.

Methods and systems are disclosed for establishing a connection between a host computing device and a preferred wireless device, such as, but not limited to, a wireless stylus, a wireless keyboard, a wireless mouse, or another wireless input device. The computing device can be, for example, a tablet computing device, a smartphone, a laptop computer, or a desktop computer.

The computing device can be a mobile computing device operating one of a variety of mobile operating systems and platforms, such as the iOS operating system (OS) developed by Apple Inc., the Android platform from Google Inc., the Microsoft Windows® 8 OS, the Microsoft Windows® Phone OS, the Symbian OS, the Blackberry OS from Research In Motion (RIM) and similar operating systems providing wireless communications capabilities.

Embodiments provide methods and systems for at least partially automating connection of a preferred wireless device to a computing device (i.e., a host device) such as a smartphone, a tablet device, and a notebook computer that is within a wireless communications range of one or more wireless devices. An exemplary system includes means of identifying a preferred wireless device, such as, for example, a stylus, based on known and calculated properties of the wireless device. The properties can include an activity level. For example, the more a stylus device is used to draw, the more preferred it becomes as compared to lesser-used styli. Also, for example, the more times a wireless input device has connected to a computing device within a certain time interval or duration, the more preferred it becomes as compared to less-frequently connected input devices.

Embodiments enable a computing device to automatically and reliably connect to a preferred wireless device (i.e., a preferred device) based on the wireless device's properties as opposed to randomly, and potentially incorrectly, selecting another, lesser-used wireless device. Exemplary embodiments reduce the likelihood of such 'wrong connections' (i.e., connections to wireless devices seldom or never used with a computing device) without requiring a user of the computing device to manually select and connect to a preferred device. According to embodiments, an in-range, available device is selected as a preferred device after comparing its usage level to usage levels of other available wireless devices. For example, after identifying a most-used, in-range wireless device in a list of available wireless devices for a given computing device, the most-used wireless device can be designated as the computing device's preferred wireless device.

An embodiment of the system implements an algorithm that takes into consideration a range of a wireless transceiver of the host computing device and wireless data links between the host computing device and wireless devices. The wireless transceiver can be a wireless network transceiver configured to communicate using a Bluetooth® protocol (i.e., a Bluetooth® transceiver). In this embodiment, wireless data links are established as Bluetooth® communication links between a host computing device and one or more wireless devices having Bluetooth® transceivers.

As embodiments of the system may not eliminate the possibility of establishing a connection to a preferred device that a user of the host computing device may wish to override, embodiments include a user interface useable to disconnect a preferred device and/or manually select another device as a new preferred device. According to an embodiment, the system discovers wireless devices after users of such devices power on the devices and start using them. Although certain embodiments are described herein with reference to pressure sensitive styli, it is to be understood that the methods, systems, and computer readable media described herein can be used to establish connections to any preferred wireless device. In certain embodiments, the wireless devices are Bluetooth® Smart devices or other Bluetooth® Low Energy (BLE) devices having Bluetooth® transceivers.

Exemplary methods and systems enable computing devices to quickly establish a connection to a preferred wireless device without requiring manual selections via a user interface or other manual steps. These embodiments allow wireless devices, such as wireless styli and other wireless input devices to be automatically connected to mobile computing devices in environments where the types and properties of available wireless devices that are discoverable (i.e., in range of a computing device's wireless network) are not known in advance.

Certain embodiments provide systems and methods for connecting preferred wireless devices, such as, but not limited to Bluetooth®-enabled devices. Such Bluetooth®-enabled devices can be BLE or Bluetooth® Smart devices. The Bluetooth® specification requires that each wireless device has a unique hardware address and this is available to high-level clients. Embodiments use this hardware address as part of a unique identifier of each wireless device. The unique identifier is provided, along with other wireless device properties, such as, for example, a signal strength, and an activity level, to a host computing device. Certain embodiments implement an algorithm that collects information about wireless devices (i.e., the wireless device properties) to determine whether to connect or not. In one non-limiting embodiment, the wireless device properties include a timestamp. Once a connection between a wireless device and a host computing device is established, an exemplary algorithm can record a cumulative quantity of input received from the wireless device. One non-limiting example of a quantity of input is a number of strokes, such as keystrokes, made with a particular input device. For example, a wireless stylus with heavy usage, as evidence by its quantity of input and/or other factors contributing to its activity level, can become a preferred device.

Should a user of a preferred device forcibly disconnect the stylus, the stylus' preferred state can be reduced. For example, the quantity of input for a forcibly disconnected stylus can be decremented by a predetermined amount. Also, for example, the activity level can be lowered based on a disconnected state. This can be used to identify inadvertent connections since a user will typically force a disconnect without using a connected wireless device if the wireless device was inadvertently connected to a given host computing device. For example, if a wireless device is forcibly disconnected from a computing device by a user, which can be an indication that the user prefers to use another wireless device with the computing device, an embodiment decreases the activity level of the intentionally disconnected wireless device so that it becomes less likely to be selected as a preferred device in the future. For example, a measure of input quantity associated with a wireless input device, such as a cumulative stroke count, can be decremented in response to determining that the wireless device has been forcibly disconnected from a computing device. In additional or alternative embodiments, in response to determining that two or more forcible disconnections of the wireless device have occurred within a certain time period (i.e., over the past day, week or month), a 'recheck' timeout for that device is incremented by a predetermined amount. According to embodiments, a recheck timeout for a given wireless device represents a delay time (i.e., in seconds) during which that wireless device will not be connected as a preferred wireless device. For example, if a wireless device has its recheck timeout increased as result of a forcible disconnect, a subsequent connection of that device as a preferred device will be delayed for a longer period of time as compared to other wireless devices with shorter recheck timeouts. In embodiments, recheck timeouts for newly discovered wireless devices are initially set to a default value (i.e., three seconds) and subsequently calculated individually based on activity associated with each wireless device. For example, a recheck timeout can be decreased or decremented for a wireless device as the quantity of input increases (i.e., an increased number of keystrokes or stroke count). This can result in this more-often used wireless device being more quickly connected as a preferred device than lesser-used devices. Also, for example, as the activity level of the a wireless input device approaches a threshold amount needed to be designated as a preferred device, i.e., thirty inputs or strokes in certain embodiments, its recheck timeout can be decreased or decremented down to zero seconds. Further, for example, a recheck timeout can be incremented for a wireless device exhibiting a relatively weak signal strength. This will delay connecting that device as a preferred device as compared to other wireless devices having stronger signals.

At connection time, an exemplary client application will scan for available wireless devices, such as styli, and delay connection to an available stylus if a preferred device (i.e., a device previously designated or determined to be preferred for that particular computing device) is not discovered. This allows time for the user to turn on their device and for the application executing on the host computing device to recognize the preferred device. An embodiment of the client application will wait a predetermined time period for a connection to be established with the preferred wireless device so that connection to other wireless available devices is restricted during the predetermined time period. After determining that the predetermined time period has expired, the client application allows for connection to another available, in-range wireless device. In one non-limiting embodiment, the predetermined time period is a tunable value with a default value of seven seconds.

The connection algorithm can take location into consideration. Wireless device properties of a discovered wireless device can include a signal strength. One example of a signal strength is a received signal strength indicator (RSSI) that indicates the strength of an underlying wireless link. In certain embodiments, a signal strength is used as a cut off point for determining candidates for connection to a host computing device. That is, a wireless device exhibiting a signal strength below a certain threshold will not be considered for connection as a preferred device until its signal strength surpasses the threshold. According to these embodiments, the signal strength threshold can be a predetermined, tunable value. An embodiment can use an RSSI indicating relative strength of an underlying Bluetooth® radio signal for a Bluetooth® communication link between a wireless device and a host computing device to infer a proximity property. For example, a relatively stronger signal for a wireless device can be used to infer closer proximity to the host computing device.

According to embodiments, a host computing device receives or is provided a list of available wireless devices. This list can include properties of newly discovered devices as well as known and calculated properties of previously discovered, in-range devices. The list can also include unique identifiers for the devices. In one embodiment, a software application executable on the computing device can be invoked to look through this list of available devices and retrieve properties for a next available wireless device and begins an evaluation process. The application can be configured to retrieve an available device from the list, and then calculate a recheck timeout for the device. In cases where the application has never seen or evaluated the device before, a default recheck timeout is assigned. In one embodiment, if the available device is newly discovered and the application has never seen the device before, it will assign a default recheck timeout of three seconds to that device. In another embodiment, if the application has never seen the device before, it will assign a longer recheck timeout to that device than the recheck timeout used for a recognized, current preferred device. Otherwise, the application determines what the current recheck timeout for the available device is based on the device's properties such as an activity level. The recheck timeout can be stored in the list as a calculated property. Next, in response to determining that the available device is the first device in the list, the application designates the device as the new preferred device. Otherwise, if the application determines that the available device is range and the current preferred device is not, the available device is designated as the new preferred device. If the application determines that the current preferred device is in range but is lesser used than the available device, the application makes the available device the new preferred device. At this point, the application selects the next available device from the list and repeats the above-noted calculations and evaluations for that next device.

After evaluating all devices in the list, the application determines whether the recheck timeout for the currently designated preferred device has expired (i.e., has passed or elapsed). If so, the application connects the preferred device to the host computing device. By using the recheck timeout and the above-described steps, the application can initially delay connecting to a newly discovered wireless device. The recheck timeout can be based on the number of times a given wireless device has been used and its relative proximity to the host computing device. One measure or indicator of proximity can be a received signal strength indicator (RSSI) indicating the relative strength of a wireless signal (i.e., a radio signal) for a wireless communication link between the wireless device and the computing device.

Once the recheck timeout is calculated for a given available wireless device, the application can then evaluate the wireless device to determine if it is a candidate device that the computing device may want to connect to as a preferred device. If this is the first wireless device in the list being evaluated and there is no current preferred device, the first available device is designated as the preferred device. Otherwise, the application evaluates the available device to determine if the device is more preferred than the current preferred device. An embodiment of the application includes comparing a cumulative quantity of input received from the available wireless device (i.e., an actual stroke count) to that of the current preferred device. In cases where multiple wireless devices are in the list, the evaluation steps are iterated (i.e., repeated in a loop) for each wireless device in the list. For example, in a second iteration, the application will have already identified a preferred device. At this point, the application can compare an activity level of the next available wireless device, such as for example, a stroke count of a stylus that is being evaluated, to the current preferred device. After repeating this process for each wireless device in the list, the in-range device having the higher activity level, which in one embodiment is measured in terms of stroke count, will be designated as the preferred device, and after preferred device's recheck timeout expires, the preferred device is connected to the host computing device. Wireless devices not selected as the preferred wireless device can remain in the list. Such devices may be subsequently evaluated, for example, if the preferred wireless device is disconnected or becomes unavailable. The exemplary application can add newly discovered, in range devices to the list and then repeat the cycle until it has again exhausted the list of available wireless devices, and at the end, selected another, current preferred device. In some embodiments, the recheck timeout for the preferred device must pass so that there is some delay prior to connecting to the preferred wireless device. These embodiments allow for disconnecting and saving properties of a previous preferred wireless device before the host computing device connects to the new preferred wireless device.

The following non-limiting examples are provided to help further introduce the general subject matter of certain embodiments.

As used herein, the term "wireless device" refers to any device capable of exchanging data over a wireless network. The data can be exchanged using a wireless transceiver in the wireless device. In certain embodiments, the wireless network is a short-range radio network. Although wireless devices can generally refer to computing devices, smartphones, and input devices, for ease of explanation, exemplary wireless devices described herein are slave devices connected to a master device (i.e., a host computing device). That is, wireless devices are devices that are discoverable by a host computing device and that the host computing device selects as a preferred wireless device (i.e., a preferred device). In certain embodiments, the wireless devices are BLE devices. In embodiments, the wireless devices are input devices configured to provide input data to a host computing device.

As used herein, the term "input device" refers to any device usable to interact with an interface of a computing device. An input device may be a pointing/drawing device such as a stylus. Input devices can be configured to interact with a touch-sensitive interface of a computing device, such as a touch surface or a touch-sensitive display. As used herein, a "stylus" refers to any writing, drawing, or pointing instrument or utensil that is generally configured to be hand-held and, in the context of touch screen computing devices, used to interact with a computing device having a touch-sensitive interface or touch surface (i.e., a touch computing device). The terms "input device" and "stylus" are used interchangeably herein to refer broadly and inclusively to any type of wireless input device capable of connecting to and interacting with a touch computing device.

As used herein, the term "network connection" refers to a communication channel of a data network. A communication channel can allow at least two computing devices or systems to communicate data to one another. A wireless network connection can also allow a computing device (i.e., a host device) to communicate with a wireless device. Such a wireless connection can be a full duplex communications link over a short-range radio network, such as, for example, a Bluetooth® wireless communication link. As would be understood by those skilled in the relevant art(s), a Bluetooth® wireless communication link can operate in an unlicensed industrial, scientific and medical (ISM) radio band in the 2400-2480 MHz frequency range using a frequency hopping transceiver. As described below with reference to FIG. 2, such a transceiver can be included in wireless devices, such as styli, and host computing devices, such as tablet devices. A Bluetooth® wireless communication link can allow real-time data and audio/video (AV) communications between host computing devices and wireless devices. The protocol for such a link is based on time slots. A wireless communication link can be established as a radio link between a wireless transceiver in a host computing device and respective wireless transceivers in one or more wireless devices. A wireless communication link can also be established between a wireless transceiver in a first computing device and another wireless transceiver in another computing device. A communication channel can include an operating system of a first computing system using a first port or other software construct as a first endpoint and an operating system of a second computing system using a second port or other software construct as a second endpoint. Applications and modules hosted on a computing system can access data addressed to the port. For example, the operating system of a first computing system can address packetized data to a specific port on a second computing system by including a port number identifying the destination port in the header of each data packet transmitted to the second computing system. When the second computing system receives the addressed data packets, the operating system of the second computing system can route the data packets to the port that is the endpoint for the socket connection. An application or module can access data packets addressed to the port. Wireless devices that are in-range of a wireless transceiver of a host computing device can broadcast packets with wireless device properties. Such properties can be sent via wireless communication links, network connections, and communications channels.

As used herein, the term "advertiser" refers to a wireless device, such as a Bluetooth® Smart device or a Bluetooth® low energy (BLE) device, that broadcasts advertising packets during advertising events on advertising channels of a wireless network, such as a Bluetooth® network. An advertising event associated with an advertiser can include a series of between one and three advertising packets on different advertising channels sent by the advertiser.

As used herein, the term "electronic content" is used to refer to any type of media that can be rendered for display or use at a computing device such as a computing device or another electronic device. Electronic content can include text or multimedia files, such as images, audio/video (AV) data, or any combination thereof. Electronic content can also include application software that is designed to perform one or more specific tasks at a computing device. Electronic content, such as AV data, can be transmitted via wireless networks, such as the exemplary wireless network 106 discussed below with reference to FIGS. 1 and 2. Electronic content can also include application software that is designed to perform one or more specific tasks at a computing system or computing device. Computing devices include client and server devices such as, but not limited to, servers, desktop computers, laptop computers, smartphones, video game consoles, smart televisions, tablet computers, portable gaming devices, personal digital assistants (PDAs), etc. Computing devices can function as host computing device (i.e., a host device) in a wireless network. Electronic content can be streamed to, downloaded by, and/or uploaded from computing devices. Electronic content can include multimedia hosted on websites, such as Internet web sites, intranet web sites, standard web pages, or mobile web pages specifically formatted for display on mobile computing devices. Electronic content can also include application software developed for computing devices that is designed to perform one or more specific tasks at the computing device.

Unless specifically stated differently, a "user" is interchangeably used herein to identify a user account, a human user, or a software agent. Besides a human user who connects wireless devices to computing devices, a software application or agent sometimes needs to connect wireless devices. Accordingly, unless specifically stated, the term "user" as used herein does not necessarily pertain to a human being.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

These illustrative examples are given to introduce the reader to the general subject matter discussed here and are not intended to limit the scope of the disclosed concepts. The following sections describe various additional embodiments and examples with reference to the accompanying. In the drawings, generally, common or like reference numbers indicate identical or functionally similar elements. Additionally, generally, the left-most digit(s) of a reference number identifies either the drawing in which the reference number first appears or the drawing in which a related element first appears. The following sections describe various additional embodiments and examples with reference to the drawings in which like numerals indicate like elements. For brevity, only the differences occurring within the Figures, as compared to previous or subsequent ones of the figures, are described below.

Exemplary High Level Architecture

FIG. 1 is diagram illustrating an example high-level architecture showing wireless devices 103a, 103b and computing devices 104a, 104b configured to connect to the wireless devices 103a, 103b, via a wireless network 106. The computing devices 104a, 104b can include any type of computing devices, such as tablet computers, smartphones, laptop computer, desktop computers, etc. In exemplary embodiments, computing devices 104a, 104b have at least one user interface comprising a touch surface, such as a touch screen. A computing device 104a, can be, but is not limited to, a personal computer (PC), a Personal Digital Assistant (PDA), a tablet computing device, an iPhone™, an iPod™, an iPad™, a device operating the Android operating system (OS) from Google Inc., a device running the Microsoft Windows® 8 OS, a device running the Microsoft Windows® Phone OS, a device running the Symbian OS, a device running the webOS from Hewlett Packard, Inc., a mobile phone, a BlackBerry® device, a smartphone, a hand held computer, a netbook computer, a palmtop computer, a laptop computer, an ultra-mobile PC, a portable gaming system, or another similar type of mobile computing device having a capability to communicate with an input device 10, the wireless network 106. In some embodiments, the computing devices 104a, 104b can each be the same type of computing device. In other embodiments, the computing devices 104a, 104b can be different types of computing devices.

The computing devices 104a, 104b can each be in communication with the wireless devices 103a, 103b via the wireless network 106. In the exemplary embodiments illustrated in FIG. 1, the wireless network 106 can be a short-range radio network, such as, for example a Bluetooth® network. For example, the wireless network 106 can use short-wavelength radio transmissions to communicate wireless device properties 18a, 18b of wireless devices 103a and 103b, respectively, to computing devices 104a, 104b via communication links 20a, 20b. In such embodiments, the computing devices 104a, 104b can discover the wireless devices 103a, 103b that are in range of their wireless transceivers (see wireless transceivers 125a, 125b in FIG. 2).

In accordance with embodiments, the wireless devices 103a, 103b can be advertiser devices (i.e., advertisers) configured to broadcast advertising packets during advertising events on advertising channels of the wireless network 106. For example, computing devices 104a, 104b that wish to form a connection with wireless devices 103a, 103b can be configured to listen for connectable advertising packets sent via communication links 20a and 20b, respectively. When configured this way, the computing devices 104a, 104b can function as initiators. If an advertiser wireless device 103a uses a connectable advertising event, an initiator computing device 104a can make a connection request using the same advertising channel on which it received the connectable advertising packet. In the example of FIG. 1, the advertising channel and the advertising packets can use communication link 20a. The advertising event is ended and connection events begin if the advertiser wireless device 103a receives and accepts the request for a connection to be initiated. Once a connection is established, the initiator computing device 104a becomes a master computing device (i.e., a host computing device). In this non-limiting example, the wireless network 106 functions as a piconet and the advertising wireless device 103a functions as a slave wireless device. According to this embodiment, the wireless network 106 is a piconet functioning as ad-hoc network linking one or more of computing devices 104a, 104b to wireless devices 103a, 103b using a wireless communication protocol, such as, for example, a Bluetooth® protocol. With continued reference to FIG. 1, connection events can be used to send data packets between the host computing device 104a and the slave wireless device 103a. In wireless network 106, channel hopping can occur at the start of each connection event. Within a connection event, the host computing device 104a and the wireless device 103a can alternate sending data packets using the same data channel. For example, the host computing device 104a can initiate the beginning of each connection event and can end each connection event at any time.

The wireless device properties 18a, 18b for each of the wireless devices 103a, 103b can include, for example, a unique identifier and an activity level. In accordance with embodiments, the unique identifier can be the hardware address of the wireless device 103a or include the hardware address with additional information. The wireless device properties 18a, 18b for the in-range wireless devices 103a, 103b can be stored in available device lists 14a and 14b on computing devices 104a and 104b, respectively. As shown in FIG. 1, each computing device 104a, 104b can populate its own, local available device list 14a, 14b with the wireless device properties 18a, 18b received via communications links 20a, 20b.

As described in further detail below with reference to FIGS. 2 and 3, as part of a process for connecting to a preferred wireless device 103, a computing device 104 can retrieve wireless device properties 18 of an available wireless device 103 from the available device list 14. The retrieved wireless device properties 18 can then be used to calculate a recheck timeout for particular available wireless device 103. Next, in response to determining that the recheck timeout has expired (i.e., elapsed or passed), the computing device 104 can connect the available wireless device 103 to the computing device 104 as a preferred wireless device 103, where the connecting is based at least in part on the wireless device properties 18 retrieved from the available device list 14. In an embodiment, the available wireless device 103 is only connected as a preferred wireless device if the activity level in its wireless device properties 18 exceeds other activity levels in wireless device properties of other available wireless devices. Exemplary activity levels are described below with reference to FIG. 3. Once connected as a preferred wireless device, the wireless device 103 configured as an input device can be used as an input device on the computing device 104. For example, the computing device 104a accept input from the wireless device, such as a wireless stylus, in any suitable application, such as, but not limited to, Adobe® Ideas® or Adobe® Illustrator®.

For example, each of the computing devices 104a, 104b can be configured to receive inputs from a connected input device 103 for selecting, modifying, or otherwise using assets. The wireless devices 103a, 103b can include any suitable device configured for providing input data, other data, and/or control signals to the computing devices 104a, 104b. A non-limiting example of a wireless device 103 is a wireless stylus configured to provide touch inputs to a touch screen device.

Exemplary System Implementation

Figure 2:
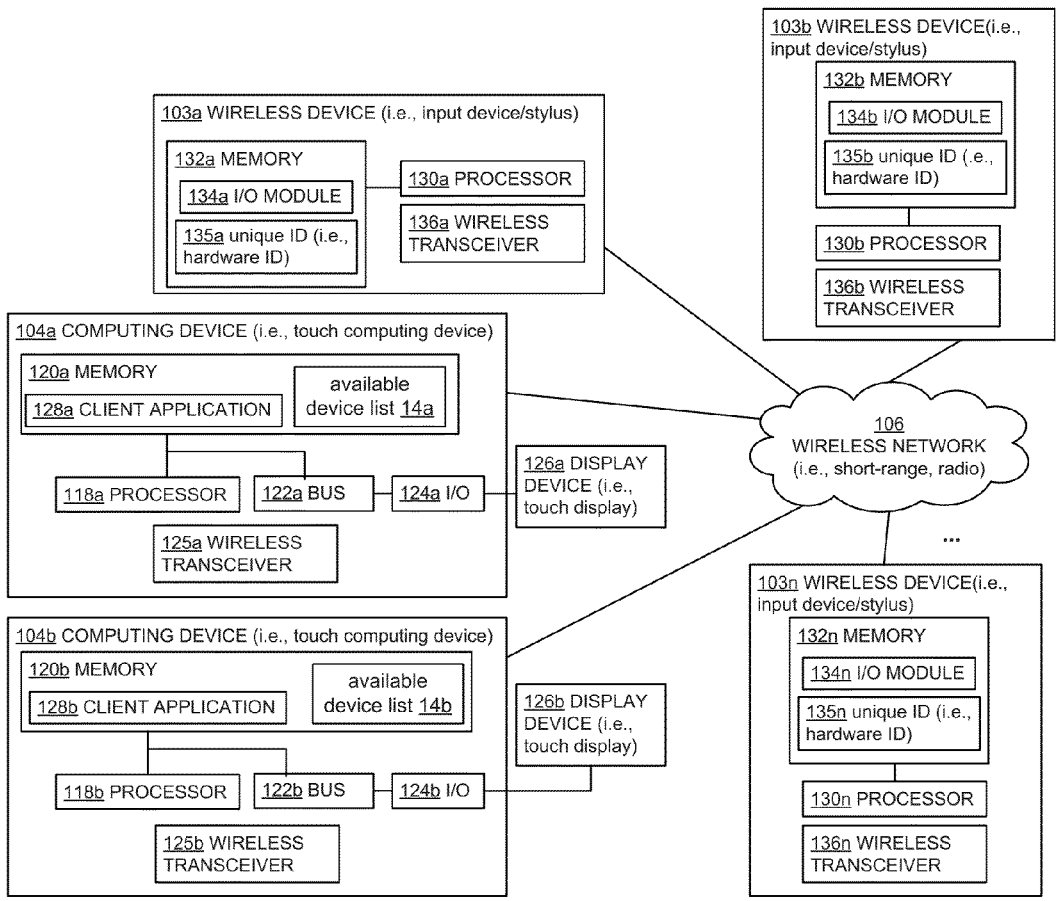
FIG. 2 is a block diagram depicting exemplary computing devices and systems for implementing certain embodiments.

FIG. 2 is a block diagram depicting example computing devices and systems for implementing certain embodiments. FIG. 2 is described with continued reference to the embodiment illustrated in FIG. 1. However, FIG. 2 is not limited to that embodiment. The exemplary computing devices include computing devices 104a, 104b in communication with wireless devices 103a-n via a wireless network 106.

Each of the computing devices 104a, 104b can include respective processors 118a, 118b. The processor 118a, 118b may include a microprocessor, an application-specific integrated circuit (ASIC), a state machine, or other suitable processing device. The processor 118a can include any number of computer processing devices, including one. The processors 118a, 118b can be communicatively coupled to a computer-readable medium, such as memories 120a, 120b. The processors 118a, 118b can execute computer-executable program instructions and/or accesses information stored in the respective memories 120a, 120b. The memories 120a, 120b can store instructions that, when executed by the processors 118a, 118b, cause the processors to perform operations described herein.

A computer-readable medium may include (but is not limited to) an electronic, optical, magnetic, or other storage device capable of providing a processor (see, e.g., the processor 604 of FIG. 6) with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

FIG. 2 illustrates client applications 128a, 128b respectively comprised in the memories 120a, 120b of the computing devices 104a, 104b. Each of the client applications 128a, 128b can include one or more software modules for discovering wireless devices available via a wireless network 106, establishing communication with the wireless devices 103 to receive their respective wireless device properties 18, and subsequently receive input data, and other data from a connected wireless device 103. Each of the client applications 128a, 128b can also include one or more software modules for performing functions in addition to establishing a connection with a preferred wireless device 103. For example, each of the client application 128a, 128b can be an image manipulation application having a software module for communicating with a cloud application or cloud service. In some embodiments, each of the client application 128a, 128b can be a different type of application including different functionality. For example, a client application 128a can be Adobe® Ideas® and a client application 128b can be Adobe® Illustrator®. In some embodiments, the client applications 128a, 128b can be stand-alone applications. In other embodiments, the client applications 128a, 128b can be embedded in another application, such as an image manipulation application.

The computing devices 104a, 104b can include any suitable computing device or system for communicating via a wireless network 106 with wireless devices 103a-n and executing the client applications 128a, 128b. Non-limiting examples of a suitable computing device or system include a desktop computer, a tablet computer, a smartphone, or any other computing device or system suitable for using electronic content.

Each of wireless devices 103a-n can include a respective processor 130a-n and a storage medium or memory 132a-n. In the non-limiting example of FIG. 2, a wireless device 103a can be an input device embodied as a stylus. The processor 130a of such a wireless device 103a can execute instructions stored in the memory 132a. The memory 132a can include an I/O module 134a. The I/O module 134a can establish communications with one or more of the computing devices 104a, 104b. The wireless device 103a can communicate with the computing devices 104a, 104b over the wireless network 106 or another wireless network, such as a Bluetooth® network, via a wireless transceiver 136a or other suitable communication device. In one embodiment, the wireless transceiver is a wireless network transceiver configured to communicate using a Bluetooth® protocol (i.e., a Bluetooth® transceiver).

A non-limiting example of a wireless device 103b is a stylus or other device configured to provide a touch input or other input to computing devices 104a, 104b. In certain embodiments, the wireless device 103b is a multifunctional stylus having the storage medium or memory 132b and a wireless transceiver 136b in its body. In other embodiments, the multifunctional stylus also includes a physical button (see, e.g., button 513 in FIG. 5) and a light emitting diode (LED) such as the LED 519 shown in FIG. 5.

In some embodiments, the memories 132a-n and I/O modules 134a-n can be implemented as firmware. As used herein, the term "firmware" is used to refer to one or more operating instructions for controlling one or more hardware components of a device. Firmware can include software embedded on a hardware device. A firmware module or program can communicate directly with a hardware component, such as the processor 130a of the wireless device 103a, without interacting with the hardware component via an operating system of the hardware device.

Exemplary Method for Connecting to a Preferred Wireless Device

Figure 3:
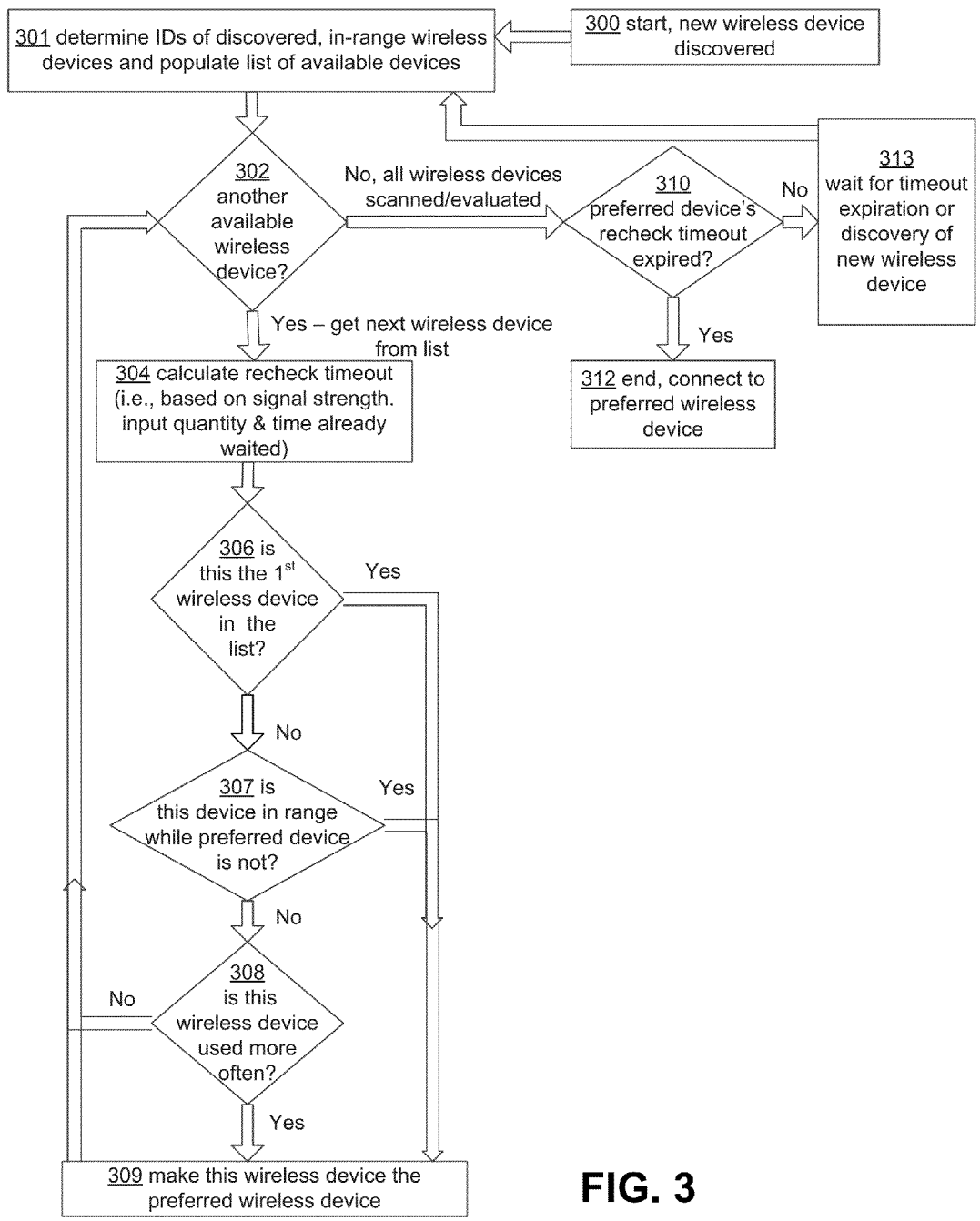
FIG. 3 is a flow chart illustrating an exemplary method for connecting a wireless device to a computing device as a preferred device, in accordance with embodiments.

FIG. 3 is a flow chart illustrating an example method for connecting to a preferred wireless device. For illustrative purposes, the method is described with reference to the data/communication flows depicted in FIG. 1 and the system implementation depicted in FIG. 2. Other implementations, however, are possible. Optional portions of steps are indicated in the flowchart by parenthetical phrases (see, e.g., step 304).

FIG. 3 illustrates an iterative loop (i.e., steps 302-309) that evaluates all in-range wireless devices (from a list populated in step 301) to determine which available device will be designated to be a preferred device. The method can be performed on a host computing device 104 and can be implemented by a client application 128 executing on the computing device 104. According to an embodiment, the method can be implemented as a behind the scenes, automated process that does not require manual steps or user inputs beyond turning on the computing device 104 and one or more wireless devices 103.

The method begins in step 300 when a new wireless device is discovered. This step can be performed as part of a discovery process by a computing device 104. For example, step 301 can involve identifying a new, in-range input device that is in communication with computing device 104. For example, this step can be performed by a client application 128b executing on a computing device 104b discovering and identifying a new wireless device 103 in communication with the computing device 104b. In an embodiment, as the newly discovered wireless has not yet been used, its activity level is set to zero (i.e., zero strokes or inputs). After the new wireless device is discovered, control is passed to step 301 where unique identifiers of discovered, in-range wireless devices are determined.

As shown, step 301 comprises populating a list of available devices. The list can be the available device list 14 described above with reference to FIGS. 1 and 2. This step can comprise receiving wireless device properties 18 of wireless devices 103 that are in communication with the computing device 104 via a wireless network 106. In embodiments, the wireless device properties 18 can include an activity level in addition to the unique identifier. As discussed above with respect to step 300, any newly discovered wireless device will have an activity level of zero. After the list of available devices is populated, control is passed to step 302. Step 301 can include receiving properties and identifiers for discovered, in-range wireless devices 103.

Next, in step 302, a determination is made as to whether an available device in the list of available devices still needs to be evaluated. If it is determined that there is another available device in the list of available devices that has not yet been evaluated, properties for that available device are retrieved from the list and control is passed to step 304. Step 302 can comprise querying the available device list 14 on the computing device 104 to get wireless device properties 18 for a next available wireless device 103. Otherwise, all available devices in the list have been evaluated and control is passed to step 310.

In step 304, a recheck timeout for the available wireless device under evaluation is calculated. The recheck timeout calculated in this step can be based on activity level indicating a level of activity for the available device. The activity level can be based on one or more of a quantity of inputs, a number of connections in a timespan, elapsed time since a most-recent connection, etc. This step calculates lower recheck timeout values for more active wireless devices 103, such as, for example devices having relatively higher numbers of inputs or strokes, past connections and less elapsed time since a last connection. As shown in FIG. 3, in certain embodiments, the recheck timeout calculated in step 304 is based on input quantity. For example, in one non-limiting embodiment, a new, never-before-seen device that is in range will have its recheck timeout set to a three-second default based on its activity level being zero. According to this embodiment, a newly discovered wireless device discovered in step 300 and added to the list of in-range, available devices in step 301 with an activity level of zero will have its default recheck timeout set to three seconds in step 304. Another embodiment uses a default recheck timeout of two seconds for an available device discovered in step 300. Over time, as the activity level of a wireless device approaches the amount needed to be considered a preferred device, i.e., thirty strokes or inputs in one embodiment, the recheck timeout can be decreased down to zero seconds.

Step 304 can result in the default recheck timeout increasing or decreasing as a function of the available device's wireless device properties 18 and/or activity level. An embodiment decrements the activity level for a wireless device by a predetermined amount for each forcible disconnection that has occurred for that device. In an exemplary embodiment, the activity level of a wireless device is decremented by five strokes or inputs for each forcible, intentional disconnect. Embodiments do not allow activity levels of devices to fall below zero. According to these embodiments, the minimum activity level a device can have is zero and if a device having an activity level of zero is forcibly disconnected from a host computer, the device's activity level will not be further decremented. As explained above, wireless devices with activity levels of zero are treated as new, never-before-seen wireless devices that will have their recheck timeout set to a default value (i.e., three seconds in one embodiment). In an alternative embodiments, in response to determining that two or more forcible, intentional disconnects have occurred in the past for a particular available device, the recheck timeout can be incremented by or set to a predetermined amount in step 304. In one embodiment, the predetermined amount is twenty seconds. This may be done in cases where multiple disconnections are deemed to be an indication that a user of the disconnected wireless device does not wish to have it connected as a preferred device. After the recheck timeout is calculated, control is passed to step 306.

In step 306, a determination is made as to whether the wireless device whose recheck timeout was calculated in step 304 is the first device in the list of available devices. As shown in FIG. 1, the first time the iterative loop of steps 302-309 is executed, step 306 designates the first available wireless device in the list to be a preferred wireless device (i.e., an initial preferred device).

Step 306 can comprise determining if the wireless device being evaluated is the first device in the list of available devices populated in step 301. If it is determined that the device is the first device in the list, control is passed to step 309 where the device is designated as the preferred wireless device. Otherwise, the device is not the first device in the list and control is passed to step 307 to determine if the device is in range while the current preferred device is not.

In step 307, if it is determined that the device being evaluated is currently in range and the current preferred device is not in range, control is passed to step 309 where the device is designated as the new preferred wireless device. Otherwise, control is passed to step 308 where the activity level of the device being evaluated is compared to that of the current preferred device.

In step 308, if it is determined that the wireless device being evaluated is used more often than the current preferred device, control is passed to step 309 where the device being evaluated is designated as the new preferred device. Step 308 can comprise comparing the activity level property for an available wireless device 103 being evaluated to the activity level of the current preferred device. In step 308, the activity level of an available wireless device being evaluated is compared to the current preferred wireless device. The comparison in step 308 can be based on a cumulative input quantity (i.e., an input count or a keystroke count) for the available device being evaluated and the current preferred wireless device. The input quantities for available wireless devices and the current preferred wireless device can be stored in a local, persistent data store, such as, for example, the memory 120*a* on a host computing device 104*a* performing the method. Exemplary input quantities are cumulative totals for each of the available wireless devices and can be associated with a unique identifier for each device. In one embodiment, the unique identifiers are not the hardware addresses for the wireless devices, but can comprise or be derived from hardware addresses. If the activity level of the device under evaluation is greater than that of the current preferred device, control is passed to step 309. For example, if it is determined in step 308 that the available device being evaluated has an activity level indicating more keystrokes or inputs than the current preferred device, control is passed to step 309 so that the available device under evaluation is designated to be the new preferred device instead. In this way, step 308 enables a more frequently used device to become a new preferred device in lieu of a lesser-used, current preferred device. Otherwise, the available device is used less often than the current preferred device and control is passed to back to step 302 to determine if there is another available wireless device 103 in the list.

In step 309, the available wireless device is designated as the preferred device. In an embodiment, step 309 can result in designating an available, in-range device as a new preferred wireless device based on the available device having the highest activity level (i.e., highest input quantity or keystroke count) as determined by repeating steps 304-308 for all available input devices. According to this embodiment, the result of performing method and completing step 309 can be that the most active in-range available device is designated as the preferred device. After designating the preferred device, control is passed back to step 302 to determine if there is another available wireless device 103 in the list. Step 309 does not result in the preferred device being connected to a host computing device. That is, a host computing device 104 such as a touch computing device does not connect to a preferred device designated in step 309. Instead, the host computing device 104 connects to the preferred device in step 312 after repeating steps 302-309 for all available wireless devices in the list populated in step 301, and then determining in step 310 that the recheck timeout for the preferred device has expired.

According to embodiments, steps 302-309 are repeated until all available devices in the list of available devices (i.e., the list created in step 301) have been evaluated. As a result of evaluating all available devices, the method identifies one wireless device from amongst the list of available wireless devices populated in step 301 as the preferred wireless device. In embodiments, the preferred device is determined by comparing one or more of a quantity of past connections over a time period, a cumulative quantity of input over a time period, and a quantity of data received from the available wireless device over a time period. According to embodiments, the evaluation is based on one or more of an elapsed time since a most-recent connection, a quantity of past connections, a quantity of inputs, and a quantity of data received from a wireless device.

In step 310, a determination is made as to whether the recheck timeout for the current preferred wireless device has expired. This step comprises determining if the preferred wireless device's recheck timeout calculated in step 304 has expired. Step 310 can comprise comparing the recheck timeout for the preferred wireless device to a system clock on a computing device 104 where the method is being performed. If it is determined that the recheck timeout has passed or expired, control is passed to step 312 where the host computing device 104 connects to the preferred wireless device and the method ends. Otherwise, the recheck timeout has not expired and control is passed to step 313 where the method waits for the recheck timeout to expire or for discovery of a new wireless device.

As shown in FIG. 3, step 312 is performed after repeating steps 302-309 for each of the available wireless devices in the list of available devices, and determining, in step 310 that the recheck timeout of the preferred wireless device has expired. In step 312, a connection is established to the preferred wireless device. In an embodiment, step 312 can comprise establishing a wireless connection from a host computing device 104 to the preferred wireless device 103 identified as a result of iterating steps 302-309 to evaluate the wireless devices in the list populated in step 301. In cases where the preferred wireless device 103 and the host computing device 104 each have a respective wireless transceiver, step 312 can be performed by establishing a wireless connection between the host computing device 104 and the preferred wireless device 103 via the transceivers. For example, if the wireless transceivers are wireless network transceivers configured to communicate using a Bluetooth® protocol (i.e., Bluetooth® transceivers), step 312 can comprise establishing a Bluetooth® connection between the host computing device 104 and the preferred wireless device 103.

In step 313, when either the preferred device's recheck timeout expires or a new wireless device is discovered, control is passed back to step 301. After step 301 is repeated, control is passed to step 302 to determine if there is another available wireless device 103 (i.e., a newly discovered device) in the list.

Exemplary User Interface

Figure 4:
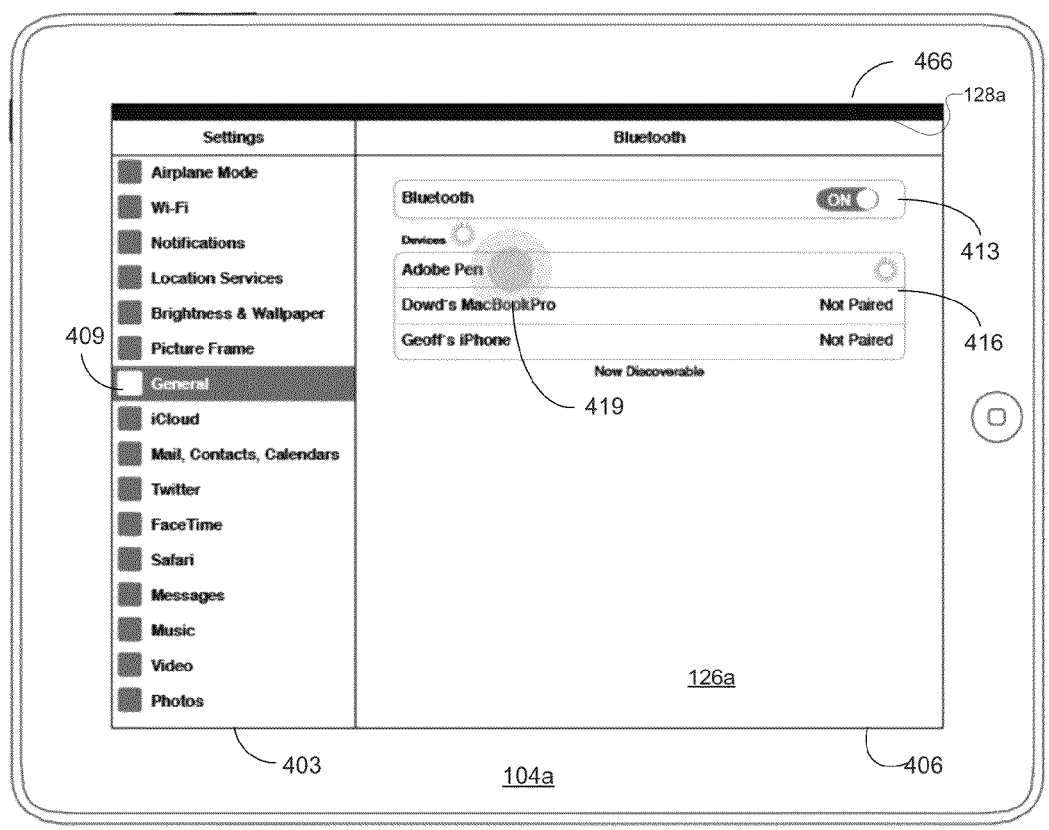
FIG. 4 illustrates an example user interface for displaying a list of available and connected wireless devices, in accordance with embodiments.

FIG. 4 shows one example of a user interface (UI), depicted herein as user interface 466, according to certain embodiments of the present disclosure, that is rendered on the display device 126*a* of the touch computing device 104*a*. As discussed above, although the exemplary systems and methods automate connection to a preferred device, the user interface 466 can be used in cases where a user of a computing device wishes to override the automatic connection and manually select a different wireless device. In embodiments, the touch computing device 104a shown in FIG. 4 may automatically select the stylus as the preferred wireless device using the method described above with reference to FIG. 3. In alternative or additional embodiments, a user operating the touch computing device 104a may interact with interface 466 to override or manually select a preferred wireless device. For example, a user may touch "Adobe® Pen" on the screen of the touch computing device 104a at 419. In response, the touch computing device 104a may process the request. The user interface 466 can also be used to forcibly disconnect a preferred wireless device, i.e., in the case of an inadvertent connection. In additional or alternative embodiments, no user interface is needed to forcibly disconnect such a wireless device, and it can be disconnected by powering it down (i.e., by using the button 513 shown in FIGS. 5A and 5B).

In the example shown in FIG. 4, the user interface 466 depicts a settings menu for the touch computing device 104a to configure certain features of the device. The exemplary user interface 466 can be rendered by the client application 128a in the display device 126a of a host computing device 104a. Shown in user interface 466 are a settings panel 403 and a details panel 406. The settings panel 403 includes a list of features of the touch computing device 104a that may each be selected for configuration. For example, the list of features in the settings panel 403 includes an "airplane mode," "Wi-Fi," "Notifications," and/or other settings for configuring the touch computing device 104a.

In the example embodiment shown in FIG. 4, the "General" feature 409 is selected and the details that correspond to the "General" feature are depicted in the details panel 406. As shown, one of the items in the "General" feature is configuring Bluetooth® functionality. When the Bluetooth® configuration 413 is turned on, the touch computing device 206 generates a list of available devices 416 with which to connect over Bluetooth®. For example, the list of available devices 416 may include an input device (i.e., a stylus such as an Adobe® stylus/pen, a laptop device such as "Dowd's MacBookPro," a smart phone such as "Geoff's iPhone," and/or any other Bluetooth®-capable device. In embodiments, the list of available devices 416 displayed in interface 466 includes at least some of the properties of available devices in available device list 14a for touch computing device 104a. For example, in additional embodiments (not shown), in addition to displaying a device name and a pairing/connectivity status, the list of available devices 416 can include a proximity indicator, an activity level/indicator, a timestamp, and/or an elapsed time since a last connection was made. The timestamp can correspond to a one or more of a last connection time, a last input/activity time, and a discovery time. The proximity indicator can be based in part on a signal strength associated with a communication link between the computing device 104a and wireless devices in the list of available devices 416. In additional or alternative embodiments, the proximity indicator can be based on a geographic distance between the computing device 104a and wireless devices in the list of available devices 416. For example, the computing device 104a can be a device configured to run a mobile operating system or platform, such as the iOS operating system (OS) developed by Apple Inc., the Android platform from Google Inc., the Microsoft Windows® 8 OS, the Microsoft Windows® Phone OS, the Symbian OS, the Blackberry OS from Research In Motion (RIM) and similar operating systems. Such operating systems and platforms can include a location service, a geographic information system (GIS), or an application programming interface (API) that can be used to determine a geographic location, such as, for example, a Global Positioning System (GPS) location, of the computing device 104a. In cases where a wireless device configured to connect to the computing device 104a is also capable of providing its GPS location from its own location services or GIS, the wireless device properties 18 for that wireless device in the available device list 14a can include a GPS location. In these cases, the proximity indicator can be based at least in part on a geographic distance between the GPS location of the computing device 104a and that of the wireless device.

Exemplary Connections Between Computing Devices and Preferred Wireless Devices

As will be described with respect to FIGS. 5A and 5B, embodiments automatically connect a wireless device to computing devices as a preferred wireless device and can visually indicate, in display devices of the computing devices, and/or on the wireless device, the connection of a preferred wireless device.

Figure 5A:
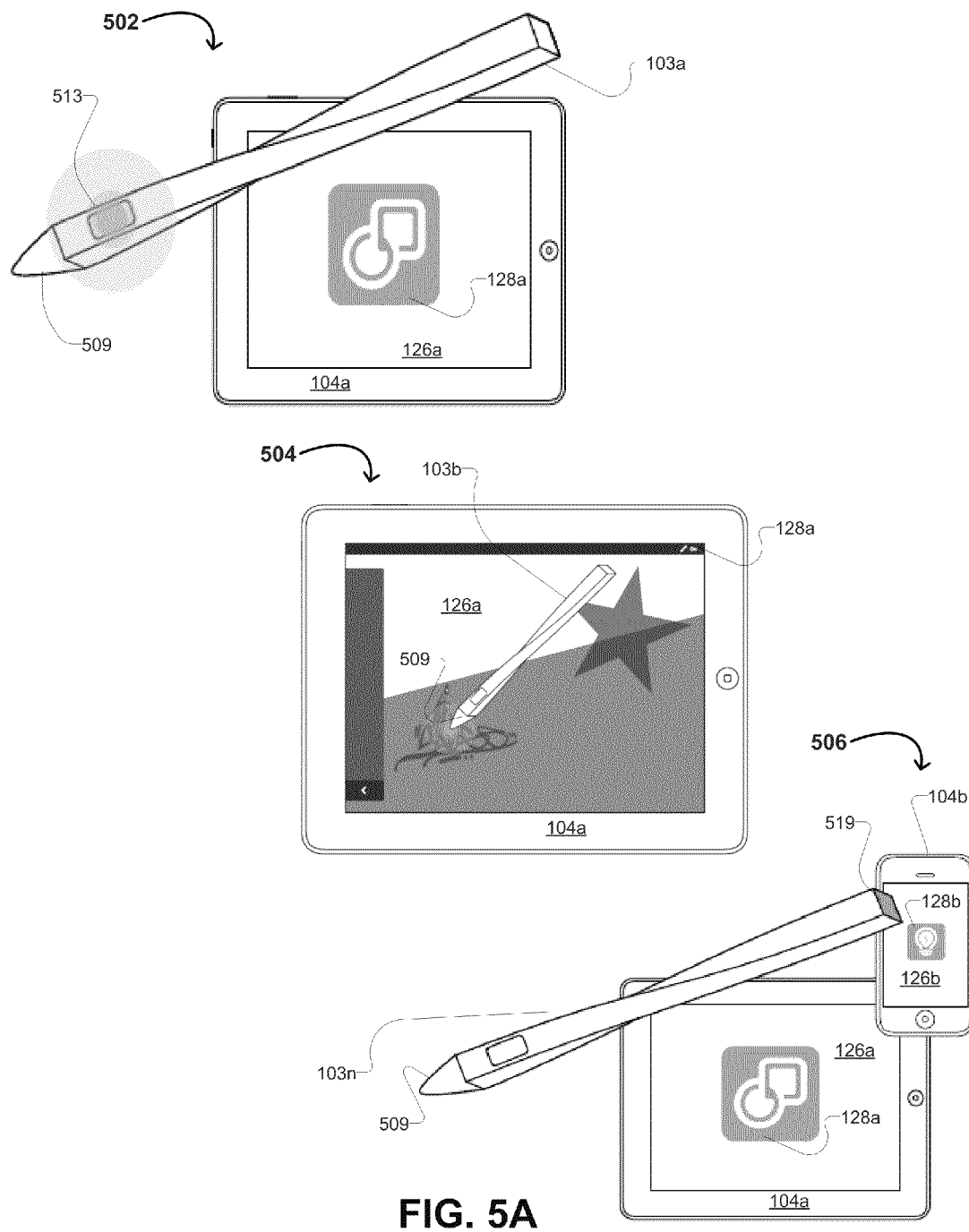
FIGS. 5A and 5B depict exemplary connections between computing devices and preferred wireless devices, in accordance with embodiments.
Figure 5B:
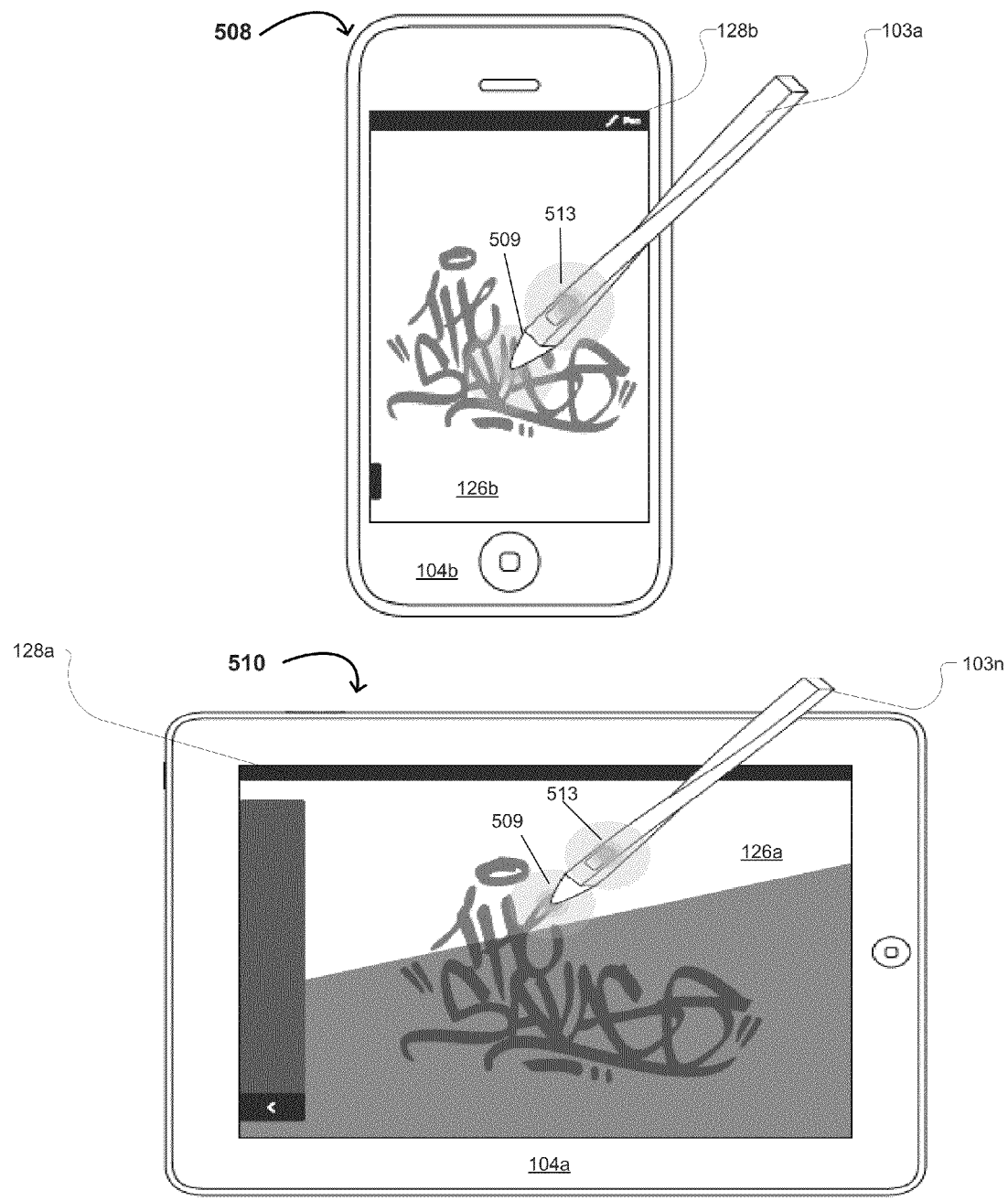

FIGS. 5A and 5B illustrate exemplary wireless stylus input devices and touch sensitive user interfaces (UIs), according to embodiments of the present disclosure. The input devices and computing devices depicted in FIGS. 5A and 5B are described with reference to the embodiments of FIGS. 1-3. However, the input devices and computing devices are not limited to those example embodiments. In an embodiment of the invention, the interfaces for client applications 128a and 128b illustrated in FIGS. 5A and 5B are displayed on mobile computing devices 104a and 104b, which each have a respective touch sensitive (i.e., touch screen) display device, namely 126a and 126b. For ease of explanation, the connection operations discussed in FIGS. 5A and 5B are in the context of a client application 128a executing on a tablet computing device 104a with a touch-screen display device 126a, and another client application 128b executing on a smartphone computing device 104b with a touch-screen display device 126b. However, the wireless device connection operations are not intended to be limited to the exemplary devices and platforms shown in FIGS. 5A and 5B. Non-limiting examples of operating systems and platforms having touch sensitive surfaces and screens include tablets and smartphones and running the iOS from Apple, Inc., the WINDOWS® Mobile OS from the MICROSOFT™ Corporation, the Windows® 8 OS from the MICROSOFT™ Corporation, the Android OS from Google Inc., the Blackberry OS from Research In Motion (RIM); and the Symbian OS. It is to be understood that the client applications 128 and user interfaces illustrated in the exemplary embodiments of FIGS. 5A and 5B can be readily adapted to execute on displays of a variety of host computing device platforms running a variety of operating systems.

Throughout FIGS. 5A and 5B, input devices and displays are shown with various icons, command regions, windows, toolbars, menus, tiles, and buttons that are used to initiate action, invoke routines, discover wireless devices, advertise availability, or invoke other functionality. The initiated actions include, but are not limited to, advertising availability (i.e., becoming an advertiser wireless device), selecting a preferred wireless device, and wireless device connection inputs and gestures. In certain embodiments, connection to a preferred wireless device is substantially automated so that the only connection input required is powering on a wireless device and a host computing device. For brevity, only the differences occurring within the figures, as compared to previous or subsequent ones of the figures, are described below.

In embodiments, the display devices 126a and 126b used to display the user interfaces shown in FIGS. 5A and 5B may be displayed via the display interface 608 and the computer display 612 described below with reference to FIG. 6. According to embodiments, a user can interact with touch screen displays 126a and 126b using the exemplary styli wireless devices 103a, 103b, and 103n shown in FIGS. 5A and 5B. However, alternative and additional wireless devices can be used, such as a different stylus, a wireless mouse, a wireless keyboard, a wireless keypad, a wireless joy stick, a wireless game controller, or other wireless input devices used to provide interaction between a user and client applications 128a and 128b. As described below with reference to FIGS. 5A and 5B, such interaction can be used once a wireless device 103 has been connected to a computing device as preferred wireless device.

FIGS. 5A and 5B illustrate how an exemplary wireless device 103a embodied as a wireless stylus having a tip 509, a button 513, and an LED 519 can be used to interact with display device 126a of a tablet computing device 104a once the wireless device 103a has been connected to the computing device 104a.

FIG. 5A shows an exemplary connection 502 between a wireless device 103a having a button 513 and a tip 509 and a touch computing device 104a. Prior to establishing the connection 502, a client application 128a on computing device 104a can scan for other available wireless devices 103b and 103n, and delay connection to those wireless devices if a preferred wireless device (e.g., wireless device 103a) is not discovered. This embodiment allows time for a user of the preferred wireless device to turn on that wireless device (i.e., by depressing the button 513) and for the client application 128a to recognize it. Although shown with a user interface in the exemplary embodiments of FIGS. 5A and 5B, the client applications 128a and 128b can run in the background (i.e., behind the scenes) and automatically establish connections to preferred wireless devices without use of a user interface.

Once the connection 502 is established, an embodiment of the client application 128a records the quantity of inputs (i.e., number of gestures, key strokes, or other inputs) made with the wireless device 103a. For example, if heavily used, the wireless device 103a can become preferred or remain more preferred than a lesser used wireless device. Should a user of forcibly disconnect the wireless device 103a, that device's preferred state is reduced. One way to accomplish this is to decrement or reduce its activity level. For example, a quantity of input or number of connections in the wireless device properties for the wireless device 103a can be reduced in response to detecting forcible disconnection of that device.

In embodiments, the wireless devices 103a, 103b and 103n shown in FIGS. 5A and 5B are pressure sensitive styli, and their respective tips 509 may be manufactured from smooth and/or gentle materials that are not harmful to touch screen display devices 126a, 126b, and 126n of the touch computing devices 104a, 104b, and 104n. As shown, the connection 502 enables a user of the wireless device 103a to interact with the client application 128a using a variety of inputs, including non-touch inputs, such as, for example, pressing the button 513 when the tip 509 is not in contact with the touch screen display device 126a.

With continued reference to FIG. 5A, an exemplary connection 504 between another wireless device 103b and the computing device 104a can be established. In embodiments, connection 504 may be established by performing method described above with reference to FIG. 3. If the method determines that the wireless device 103b has been used more often than wireless device 103a, the computing device 104a will connect to the wireless device 103b as the new preferred wireless device. As shown, the wireless device 103b will then be the active stylus useable to provide inputs (i.e., via the tip 509) to the client application 128a currently executing on the computing device 104a.

FIG. 5A depicts connections 506 that can be established between a wireless device 103n and one or both of computing devices 104a and 104b. Connections 506 show how a wireless device can move from one computing device 104a to another computing device 104b. As shown, the LED 519 of wireless device 103n can be illuminated to indicate a connectivity status as a preferred device. In embodiments, logic executable by the processor 130n of the wireless device 103n can control the LED 519 to pulsate, blink, or otherwise illuminate the LED 519 to indicate a connectivity status for the wireless device 103n. Certain wireless connections, such as Bluetooth® Low Energy (BLE) or Bluetooth® Smart connections, limit connectivity between host, or 'master' computing devices 104, such as tablet devices, and 'slave' input devices such as Bluetooth®-enabled styli. For example, a master computing device can establish multiple simultaneous BLE connections to slave devices, but a given slave device can only have a BLE connection to one master device at a time. In environments subject to such connectivity constraints, when a slave wireless device 103a is to be moved from one computing device 104a to another computing device 104b, embodiments disconnect the slave wireless device 103a from master computing device 104a so that the slave wireless device 103a can be subsequently connect to a different master computing device 104b.

FIG. 5B shows a connection 508 established between the smartphone computing device 104b and the wireless device 103a subsequent to the connection 506 between the wireless device 103n and the computing device 104b. In an embodiment, once connection 506 is established, computing device 104b will not perform the method depicted in FIG. 3 again until a disconnection to wireless device 103n occurs. In other words, while connection 506 exists, the computing device 104b does not perform the method described above with reference to FIG. 3 to evaluate available devices. Connection 508 can be made if wireless device 103n has disconnected and it is determined that wireless device 103a is more-preferred than the wireless device 103n. According to an embodiment, this determination is made by performing the method of FIG. 3 to evaluate wireless device 103a.

With continued reference to FIG. 5B, a connection 510 is shown that is maintained between the preferred wireless device 103n and the computing device 104a. Even in cases where a preferred device has changed for another computing device 104b that used to have wireless device 103n as its preferred device, FIG. 5B shows that the connection 510 between the wireless device 103n and the computing device 104a can remain. This outcome can be a result of the wireless device properties 18 the wireless device 103n, such as, for example, an activity level, remaining superior to properties of other wireless devices available to the computing device 104b.

Exemplary Computer System Implementation

Figure 6:
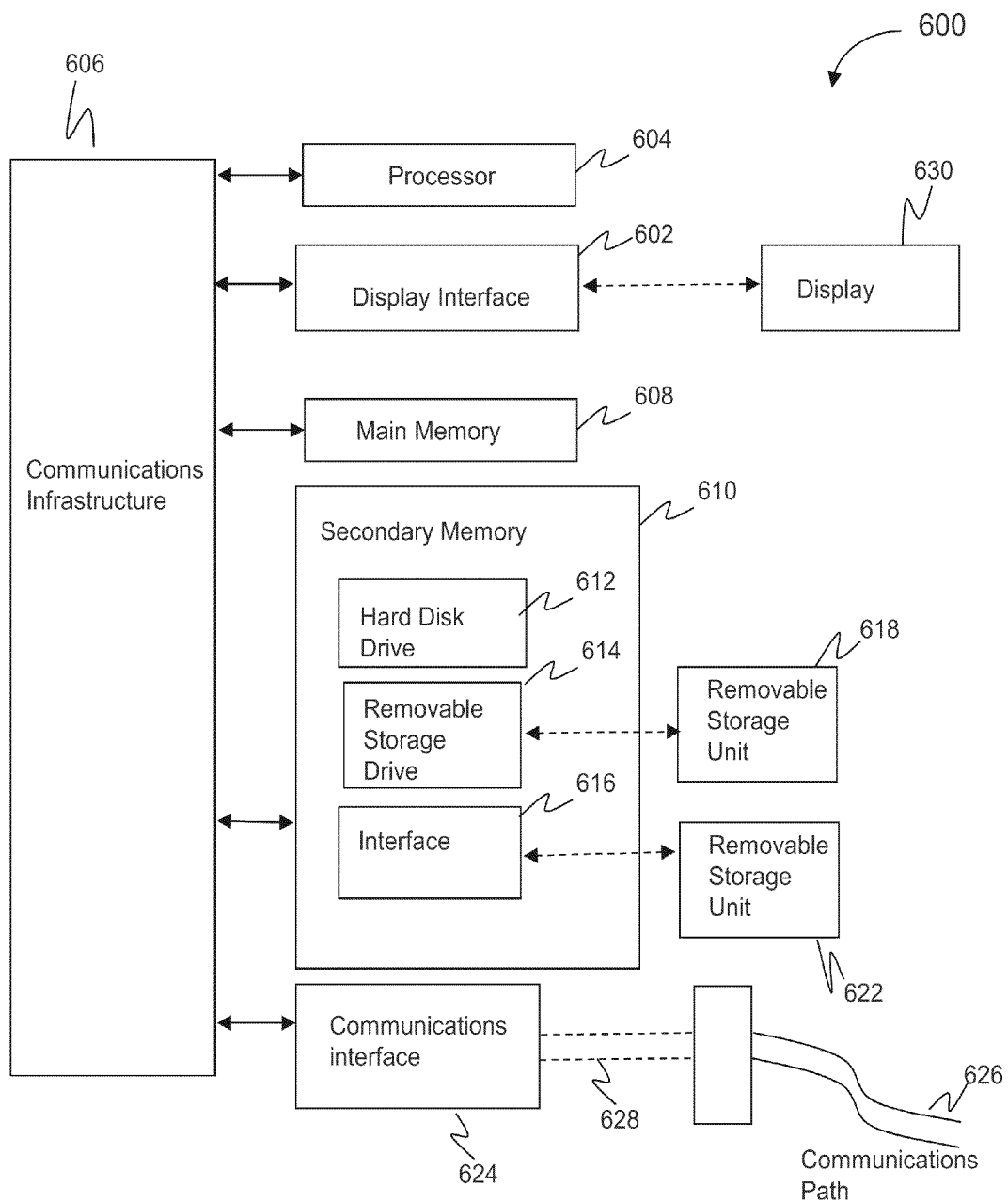
FIG. 6 is a diagram of an exemplary computer system in which embodiments of the present disclosure can be implemented.

Although exemplary embodiments have been described in terms of apparatuses, systems, and methods, it is contemplated that certain functionality described herein may be implemented in software on microprocessors, such as a microprocessor chip included in the wireless devices 103 shown in FIGS. 1, 2, 5A and 5B, and computing devices such as the computer system 600 illustrated in FIG. 6. In various embodiments, one or more of the functions of the various components may be implemented in software that controls a computing device, such as computer system 600, which is described below with reference to FIG. 6.

Aspects of the present invention shown in FIGS. 1-4, 5A and 5B, or any part(s) or function(s) thereof, may be implemented using hardware, software modules, firmware, tangible computer readable media having logic or instructions stored thereon, or a combination thereof and may be implemented in one or more computer systems or other processing systems.

FIG. 6 illustrates an example computer system 600 in which embodiments of the present invention, or portions thereof, may be implemented as computer-readable instructions or code. For example, some functionality performed by the computing devices 104*a*, 104*b* and their respective client applications 128*a*, 128*b* shown in FIGS. 2, 4, 5A and 5B, can be implemented in the computer system 600 using hardware, software, firmware, non-transitory computer readable media having instructions stored thereon, or a combination thereof and may be implemented in one or more computer systems or other processing systems. Hardware, software, or any combination of such may embody certain modules and components used to implement steps in the methods 300 illustrated by the flowchart of FIG. 3 discussed above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 600. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 604 may be a special purpose or a general purpose processor device. As will be appreciated by persons skilled in the relevant art, processor device 604 may also be a single processor in a multi-core/multiprocessor system, such system operating alone, or in a cluster of computing devices operating in a cluster or server farm. Processor device 604 is connected to a communication infrastructure 606, for example, a bus, message queue, network, or multi-core message-passing scheme. In certain embodiments, one or more of the processors 118*a*, 118*b*, and 130*a-n* described above with reference to the computing devices 104*a*, 104*b* and wireless devices 103*a-n* of FIG. 2 can be embodied as the processor device 604 shown in FIG. 6.

Computer system 600 also includes a main memory 608, for example, random access memory (RAM), and may also include a secondary memory 610. Secondary memory 610 may include, for example, a hard disk drive 612, removable storage drive 614. Removable storage drive 614 may comprise a floppy disk drive, a magnetic tape drive, an optical disk drive, a flash memory, or the like. In non-limiting embodiments, one or more of the memories 120*a* and 120*b* described above with reference to the computing devices 104*a*, 104*b* of FIG. 2 can be embodied as the main memory 608 shown in FIG. 6.

The removable storage drive 614 reads from and/or writes to a removable storage unit 618 in a well known manner. Removable storage unit 618 may comprise a floppy disk, magnetic tape, optical disk, etc. which is read by and written to by removable storage drive 614. As will be appreciated by persons skilled in the relevant art, removable storage unit 618 includes a non-transitory computer readable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or EEPROM) and associated socket, and other removable storage units 622 and interfaces 620 which allow software and data to be transferred from the removable storage unit 622 to computer system 600. In non-limiting embodiments, one or more of the memories 132*a-n* described above with reference to the wireless devices 103*a-n* of FIG. 2 can be embodied as the main memory 608 shown in FIG. 6. For example, in one non-limiting embodiment, the memory 132*a* of wireless device 103*a* can be embodied as an EPROM.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 may be in the form of signals, which may be electronic, electromagnetic, optical, or other signals capable of being received by communications interface 624. These signals may be provided to communications interface 624 via a communications path 626. Communications path 626 carries signals and may be implemented using wire or cable, fiber optics, a phone line, a cellular phone link, an RF link or other communications channels.

As used herein the terms "computer readable medium" and "non-transitory computer readable medium" are used to generally refer to media such as memories, such as main memory 608 and secondary memory 610, which can be memory semiconductors (e.g., DRAMs, etc.). Computer readable medium and non-transitory computer readable medium can also refer to removable storage unit 618, removable storage unit 622, and a hard disk installed in hard disk drive 612. Signals carried over communications path 626 can also embody the logic described herein. These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor device 604 to implement the processes of the present invention, such as the steps in the method 600 illustrated by the flowchart of FIG. 6, discussed above. Accordingly, such computer programs represent controllers of the computer system 600. Where the invention is implemented using software, the software may be stored in a computer program product and loaded into computer system 600 using removable storage drive 614, interface 620, and hard disk drive 612, or communications interface 624.

In an embodiment, the display devices 126a, 126b used to display interfaces of client applications 128a and 128b, respectively, may be a computer display 630 shown in FIG. 6. The computer display 630 of computer system 600 can be implemented as a touch sensitive display (i.e., a touch screen). Similarly, the user interfaces shown in FIGS. 4, 5A and 5B may be embodied as a display interface 602 shown in FIG. 6.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

General Considerations

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing device memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing device from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the steps presented in the examples above can be varied—for example, steps can be re-ordered, combined, and/or broken into sub-steps. Certain steps or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method comprising:
   designating, by a computing device, a first available wireless device in a list of available wireless devices to be a preferred wireless device;
   for each of the other available wireless devices in the list:
      retrieving properties of a next available wireless device from the list, the properties including an activity level based on one or more prior connections of the next available wireless device to the computing device;
      calculating, based on the retrieved properties, a recheck timeout for the next available wireless device, wherein a recheck timeout for the next available wireless device is incremented in response to determining that a signal strength associated with a communication link between the available wireless device and the computing device is less than an average signal strength for available devices in the list; and
      in response to determining that the activity level of the next available wireless device exceeds the activity level of the previously-designated preferred device, designating the next available wireless device as the preferred device.

2. The method of claim 1, further comprising:
in response to determining that the recheck timeout of the preferred wireless device has expired, connecting the preferred wireless device to the computing device.

3. The method of claim 1, further comprising:
receiving, at the computing device, properties of one or more wireless devices, the properties including, for each of the one or more wireless devices, a unique identifier and a proximity indicator; and
populating the list of available wireless devices with the received properties.

4. The method of claim 3, further comprising, prior to the populating, establishing a default recheck timeout for ones of the one or more wireless devices that have not been previously connected to the computing device.

5. The method of claim 3, further comprising, prior to the receiving, discovering, by the computing device, a plurality of in-range wireless devices having respective wireless transceivers in communication with a wireless transceiver of the computing device, wherein the receiving comprises receiving properties of the plurality of discovered wireless devices.

6. The method of claim 1, wherein:
the activity level of each wireless device in the list of available wireless devices is based on one or more of an elapsed time since a most-recent connection between the wireless device and the computing device, a quantity of past connections between the wireless device and the computing device, a quantity of past disconnections between the wireless device and the computing device, a quantity of inputs received at the computing device from the wireless device, and a quantity of data received at the computing device from the wireless device.

7. The method of claim 6, wherein:
the quantity of inputs received at the computing device from the wireless device corresponds to a cumulative number of keystrokes, touch inputs, or other inputs received from the wireless device;
the quantity of past connections between the wireless device and the computing device corresponds to a cumulative number of connections within a time period;
the quantity of past disconnections between the wireless device and the computing device corresponds to a cumulative number of forcible disconnections from the computing device within the time period;
the quantity of data received at the computing device from the wireless device corresponds to a cumulative size of electronic content items received from the wireless device; and
the quantities of past connections, disconnections, inputs, and data received are stored in a persistent data store of the computing device.

8. The method of claim 1, wherein the available wireless devices include an input device comprising a wireless transceiver configured to communicate with a wireless transceiver of the computing device.

9. The method of claim 8, wherein:
the wireless transceivers are Bluetooth® transceivers; and the
the available wireless devices include one or more of a Bluetooth® low energy device and a Bluetooth® Smart device.

10. The method of claim 1, wherein the properties of each of the available wireless devices include a proximity value.

11. The method of claim 10, wherein the proximity value is based on the signal strength associated with a communication link between a wireless transceiver of the wireless device and the computing device.

12. The method of claim 1, wherein:
the properties include a quantity of forcible disconnections from the computing device;
the activity level indicates quantity of keystrokes, touch inputs, or other inputs received at the computing device from the wireless device;
the activity level is decremented by a predetermined amount for each forcible disconnection; and
the recheck timeout for an available wireless device is decremented in response to determining that the quantity of inputs is higher than an average quantity of inputs for available devices in the list.

13. The method of claim 12, wherein:
the predetermined amount is five inputs;
a minimum activity level is zero; and
the calculating comprises setting the recheck timeout to three seconds in response to determining that the properties of the next available wireless device indicate one or more of:
an activity level of zero; and
zero prior connections to the computing device.

14. A system comprising:
one or more computing devices, each including a processor and a memory having instructions stored thereon, that, if executed by the processor, cause the processor to perform operations comprising:
receiving properties of one or more wireless devices, the properties including, for each of the one or more wireless devices, a unique identifier and an activity level;
populating a list of available wireless devices with the received properties;
designating a first available wireless device in the list to be a preferred wireless device; and
for each of the other available wireless devices in the list:
retrieving properties of a next available wireless device from the list;
calculating, based on the retrieved properties, a recheck timeout for the next available wireless device, wherein a recheck timeout for the next available wireless device is incremented in response to determining that a signal strength associated with a communication link between the available wireless device and the one or more computing devices is less than an average signal strength for available devices in the list; and
in response to determining that the activity level of the next available wireless device exceeds the activity level of the previously-designated preferred wireless device, designating the next available wireless device as the preferred wireless device.

15. The system of claim 14, the operations further comprising:
storing the list of available wireless devices in the memory; and
in response to determining that the recheck timeout of the preferred wireless device has expired, connecting to the preferred wireless device.

16. The system of claim 14, wherein:
the receiving comprises receiving at least some of the properties from the one or more wireless devices;
the unique identifier for each of the one or more wireless devices comprises a hardware address;
each of the one or more computing devices and each of the one or more wireless devices include respective wireless transceivers configured to establish a wireless communications link; and
for each of the other available wireless devices in the list, the operations further comprise:

in response to determining that the previously-designated preferred wireless device is not in-range and that the next available wireless device is in-range, designating the next available wireless device as the preferred wireless device.

17. The system of claim 14, wherein the one or more computing devices include a touch computing device comprising a touch screen interface, and wherein the one or more wireless devices include an input device comprising a wireless transceiver configured to communicate with a wireless transceiver of the touch computing device.

18. The system of claim 14, wherein the properties of each of the available wireless devices include the signal strength associated with a wireless communication link between a wireless transceiver of the wireless device and the one or more computing devices.

19. The system of claim 18, wherein:
the wireless transceiver of the wireless device is a Bluetooth® transceiver; and
the signal strength is a received signal strength indicator (RSSI) indicating strength of an underlying Bluetooth® radio signal.

* * * * *